United States Patent

Huor et al.

[11] Patent Number: 6,141,987
[45] Date of Patent: Nov. 7, 2000

[54] ABSORPTION REFRIGERATING SYSTEM AND WORKING MIXTURE FOR SAID SYSTEM

[75] Inventors: Meng Heng Huor, Labarthe sur Leze; Gilles Le Halpere, Rixheim; Michel Prevost, Toulouse; Isabelle Soide, Eaubonne, all of France

[73] Assignee: Gaz de France, Paris, France

[21] Appl. No.: 09/341,838

[22] PCT Filed: Dec. 31, 1997

[86] PCT No.: PCT/FR97/02474

§ 371 Date: Dec. 2, 1999

§ 102(e) Date: Dec. 2, 1999

[87] PCT Pub. No.: WO98/31972

PCT Pub. Date: Jul. 23, 1998

[51] Int. Cl.[7] .................................................. F25B 15/00
[52] U.S. Cl. ................................ 62/476; 62/483; 62/141
[58] Field of Search ........................... 62/476, 483, 141

[56] References Cited

U.S. PATENT DOCUMENTS

| | | | |
|---|---|---|---|
| 3,717,007 | 2/1973 | Kuhlenschmidt | 62/101 |
| 4,031,712 | 6/1977 | Costello | 62/483 |
| 4,171,619 | 10/1979 | Clark | 62/2 |
| 4,285,208 | 8/1981 | Takeshita et al. | 62/141 |
| 4,285,211 | 8/1981 | Clark | 62/335 |
| 4,471,630 | 9/1984 | Sugimoto et al. | 62/175 |
| 4,474,025 | 10/1984 | Alefeld | 62/148 |
| 4,475,353 | 10/1984 | Lazare | 62/101 |
| 4,475,361 | 10/1984 | Alefeld | 62/476 |
| 4,813,242 | 3/1989 | Wicks | 62/238.3 |
| 5,582,020 | 12/1996 | Scaringe et al. | 62/102 |
| 5,600,967 | 2/1997 | Meckler | 62/476 |
| 5,816,070 | 10/1998 | Meckler | 62/476 |

OTHER PUBLICATIONS

Database WPI, Section Ch, Week 8437, Derwent Publications Ltd., London, GB; Class J07, AN 84–230474, XP002043540 & SU 1 068 672 A (Shleinikov V M), Jan. 23, 1984.

Database WPI, Section Ch, Week 8506, Derwent Publications Ltd., London, GB; Class J07, AN 85–037100, XP002043541 & SU 1 101 634 A (Shleinikov V M), Jul. 7, 1984.

Database WPI, Section Ch, Week 8437, Derwent Publications Ltd., London, GB; Class J07, AN 84–230473, XP002043542 & SU 1 068 671 A (Shleinikov V M), Jan. 23, 1984.

*Primary Examiner*—William Doerrler
*Assistant Examiner*—Mark Shulman
*Attorney, Agent, or Firm*—Pennie & Edmonds LLP

[57] ABSTRACT

An absorption refrigeration system which utilizes absorption with a double separating effect where the pressure of the condenser (K2) is offset relative to the pressure of the second generator (G2). In this system, absorption of the working mixture is achieved using methanol as the refrigerating agent and a compound having a methylphenol group as a solvent. The system is useful for producing cold or heat, particularly for the air conditioning of elementary units of a building.

17 Claims, 2 Drawing Sheets

ABSORPTION REFRIGERATING SYSTEM AND WORKING MIXTURE FOR SAID SYSTEM

FIELD OF THE INVENTION

This invention relates to an absorption refrigeration system and to a solvent-refrigerant operating combination for use in an absorption refrigeration system.

BACKGROUND OF THE INVENTION

Currently, there are three known types of absorption refrigeration systems: The single-separation absorption system, the single absorption and recompression system, and the double-absorption system.

Of these three systems, the double-separation-effect absorption system is the one that permits obtaining the coefficient of frigorific performance (COP) which is defined as the ratio between the amount of heat absorbed at the cold source and the amount of calorific energy absorbed at the source of the highest motive heat.

This coefficient of frigorific performance, or COP, is thus representative of the output of the refrigeration system. Yet even with a double separation absorption refrigeration system the COP does not go beyond a value of 1 while in theory the COP should be able to reach a value of 1.3.

SUMMARY OF THE INVENTION

The invention is aimed at remedying that shortcoming.

To that effect a double separation absorption refrigeration system is proposed which is comprised primarily of: (a) a first high-pressure, high-temperature generator, (b) a second generator with a lower pressure and temperature than the first generator, feeding by way of refrigerant vapor ducting a condenser at the same pressure as the second generator but at a temperature lower than that of the second generator, (c) a condenser at the same pressure as the said second generator but at a temperature lower than that of the latter; (d) an evaporator at a pressure and temperature lower in each case than that of the condenser; (e) an absorber at the same pressure as the evaporator and the same temperature as the condenser; and (f) a compression device positioned in the ducting that feeds the first generator with a refrigerant-rich solution which solution is derived from the absorber, the system characterized in that the said condenser is at a pressure greater than that of the said second generator yet lower than that of the said first generator.

According to another characteristic feature of the refrigeration system of this invention, the condenser pressure is produced by compressing the refrigerant vapors emanating from the said second generator by means of a vapor compression device located in the ducting that feeds the refrigerant vapor to the said condenser.

According to yet another characteristic feature of the refrigeration system of this invention, the said refrigerant-rich solution is a solvent-refrigerant operating combination where the solvent is a compound selected from the methyl phenol group, taken either individually or as a mixture.

According to still another characteristic feature of the refrigeration system of this invention, the said methyl phenols are orthocresol, metacresol and paracresol.

Also proposed by this invention is a solvent-refrigerant operating combination for use in an absorption refrigeration system characterized in that the refrigerant is a compound selected from the methyl phenol group, taken individually or as a mixture, and that the solvent is methanol.

According to a characteristic feature of the operating combination per this invention, the said methyl phenols are orthocresol, metacresol and paracresol.

BRIEF DESCRIPTION OF THE DRAWINGS

This invention will be better understood, and its other purposes, characteristics, details and advantages will become more clearly evident, by means of the following explanatory description provided in reference to the attached figures in which.

DETAILED DESCRIPTION OF THE INVENTION

The operating principle and the major elements of the prior-art double-separation absorption refrigeration system are described below with reference to FIG. 1.

Figure 1:
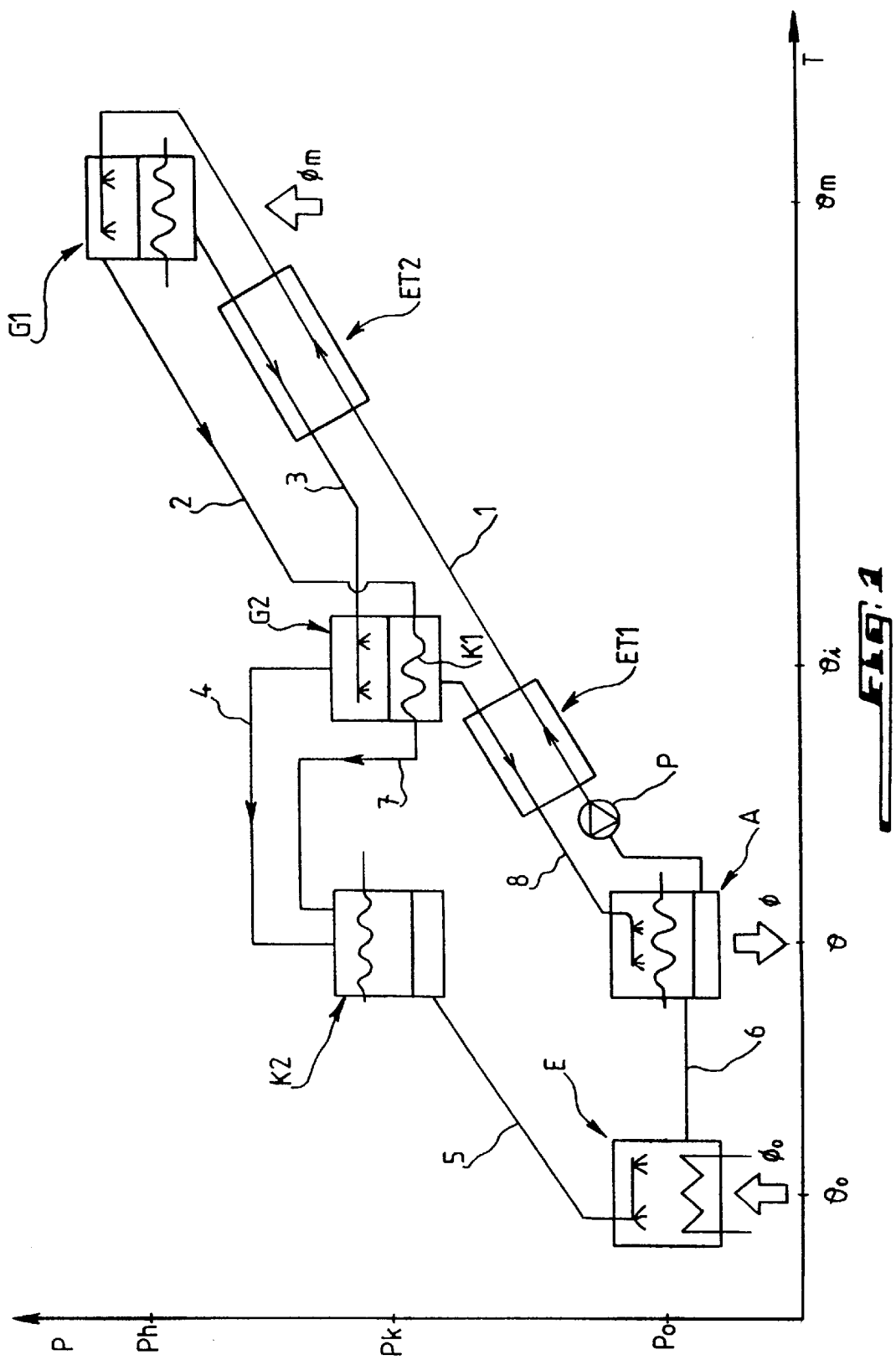
FIG. 1 is a schematic illustration of a prior-art double-separation absorption refrigeration system, indicating the operational conditions of each element in terms of pressure and temperature, the abscissa showing the temperature, the Y-coordinate showing the pressure.

That system utilizes the reciprocal affinity of the molecules between a volatile substance, the refrigerant or cold-producing agent in the evaporator E of FIG. 1, and a liquid stabilizing substance, the absorbant. This absorbant is also referred to as the solvent. The solvent-refrigerant combination in turn is also referred to as the active or operating combination where the refrigerant is the more volatile of the two substances.

In that type of refrigeration system only the refrigerant must travel through the line section of the system where the cold is generated, meaning the line section between the condenser K2 and the absorber A in FIG. 1, circuit 5.

In essence, the cold is generated at the evaporator E where the phenomenon of refrigerant evaporation consumes calorific energy, $\phi_o$ in FIG. 1, supplied in part by the element which is to be cooled and is thus cooled.

Since only the refrigerant must travel through this line section, as complete as possible a separation of the refrigerant and the solvent must take place.

In the system per FIG. 1, this separation is obtained in two successive stages, in the generator G1 of FIG. 1 and in the generator G2 of FIG. 1. In that fashion, as shown in FIG. 1, the refrigerant-rich solution (the mixture of solvent and refrigerant) emanating from the absorber A possibly via an intermediate storage of the refrigerant-rich solution, having a temperature $\theta$ per FIG. 1 and a pressure $P_o$ per FIG. 1, is fed through the duct 1 in FIG. 1 to the generator G1 which has a temperature $\theta_m$ per FIG. 1 and a pressure $P_h$ per FIG. 1 derived by means of compression P in FIG. 1, and passing through the heat exchangers ET1 and ET2 in FIG. 1.

The refrigerant-rich solution is then heated to the temperature $\theta_m$ in G1.

A first solvent-refrigerant separation takes place in this generator G1, producing frigorific vapors.

This first separation necessitates an external supply of calorific energy from any given source, referred to as motive calorific energy, shown as $\phi_m$ in FIG. 1.

The refrigerating vapors emanating from G1 are now channeled via the ducts 2 in FIG. 1 to the second generator G2. The solution that is largely stripped of the refrigerant and contained in G1 is likewise sent to G2 by way of the heat exchanger ET2 and is subjected at the input or output of the latter to a pressure drop by any suitable means. In ET2, the hot, refrigerant-poor solution circulating in the duct 3 provides thermal energy to the refrigerant-rich solution emanating from the absorber and circulating in the duct 1.

In the generator G2 which is at the temperature level $\theta_i$ in FIG. 1 and pressure level $P_k$ in FIG. 1, where $\theta<\theta i<\theta m$ and $Po<Pk<Ph$, the refrigerant vapors exiting from G1 and circulating in duct 2 heat up the refrigerant-poor solution emanating from the generator 1 and are condensed to the pressure level Ph in a condenser K1 per FIG. 1.

A new separation of the refrigerant from the refrigerant-poor solution exiting from G1 now takes place in G2 with the generation of new refrigerant vapors.

This is what is referred to as the double separation effect.

Both the liquid refrigerant exiting from G2 (vapors emanating from G1 and condensed in K1) and the refrigerant vapors exiting from the generator G2 are channeled to the condenser K2 per FIG. 1 via the ducts 7 and 4, respectively, in FIG. 1, while the solution that is further stripped of refrigerant is sent back to the absorber A through the duct 8 in FIG. 1 by way of the heat exchanger ET1, where part of its thermal energy is transferred to the refrigerant-rich solution circulating in duct 1.

The condenser K2 is at the same pressure Pk as the generator G2 and at the same temperature $\theta$ as the absorber A.

In the condenser K2 the refrigerant vapors exiting from the generator G2 are condensed. The liquid refrigerant in duct 7 is subjected to a pressure drop, by any suitable means, before entering K2.

It should be noted that from the generator G2 up to the absorber A only the refrigerant is circulating.

Then only, with the pressure lowered by any suitable means, the liquid refrigerant is transferred by way of the duct 5 in FIG. 1 to the evaporator E.

The evaporator E is at the same pressure Po as the absorber A and at the same temperature $\theta_o$, per FIG. 1, which temperature $\theta_o$ is lower than the temperature $\theta$ of the absorber.

In the evaporator E the refrigerant is evaporated by consuming calorific energy $\phi_o$ per FIG. 1, supplied by the element to be refrigerated. This evaporator E is the cold source of the system.

The refrigerant vapors produced in the evaporator E are now channeled to the absorber A via the duct 6 in FIG. 1.

In the absorber A the refrigerant vapors are finally absorbed in the refrigerant-poor solution coming from the generator G2 after the pressure of the solution has been lowered, reconstituting the refrigerant-rich solution which is once again sent to the generator G1 for a new operating cycle.

As can be seen in FIG. 1, the condenser K2 and the generator G2 in this system are at the same operating pressure.

For the expert it is easy to see that the operation of this system requires provisions for producing a pressure drop in each cycle. These provisions and their configuration are known to the expert, and although they are neither covered in this description nor shown in FIGS. 1 and 2, these provisions are an integral part of the double-separation refrigeration system here discussed.

This invention is aimed at shifting the operating pressure between the generator G2 and the condenser K2.

Figure 2:
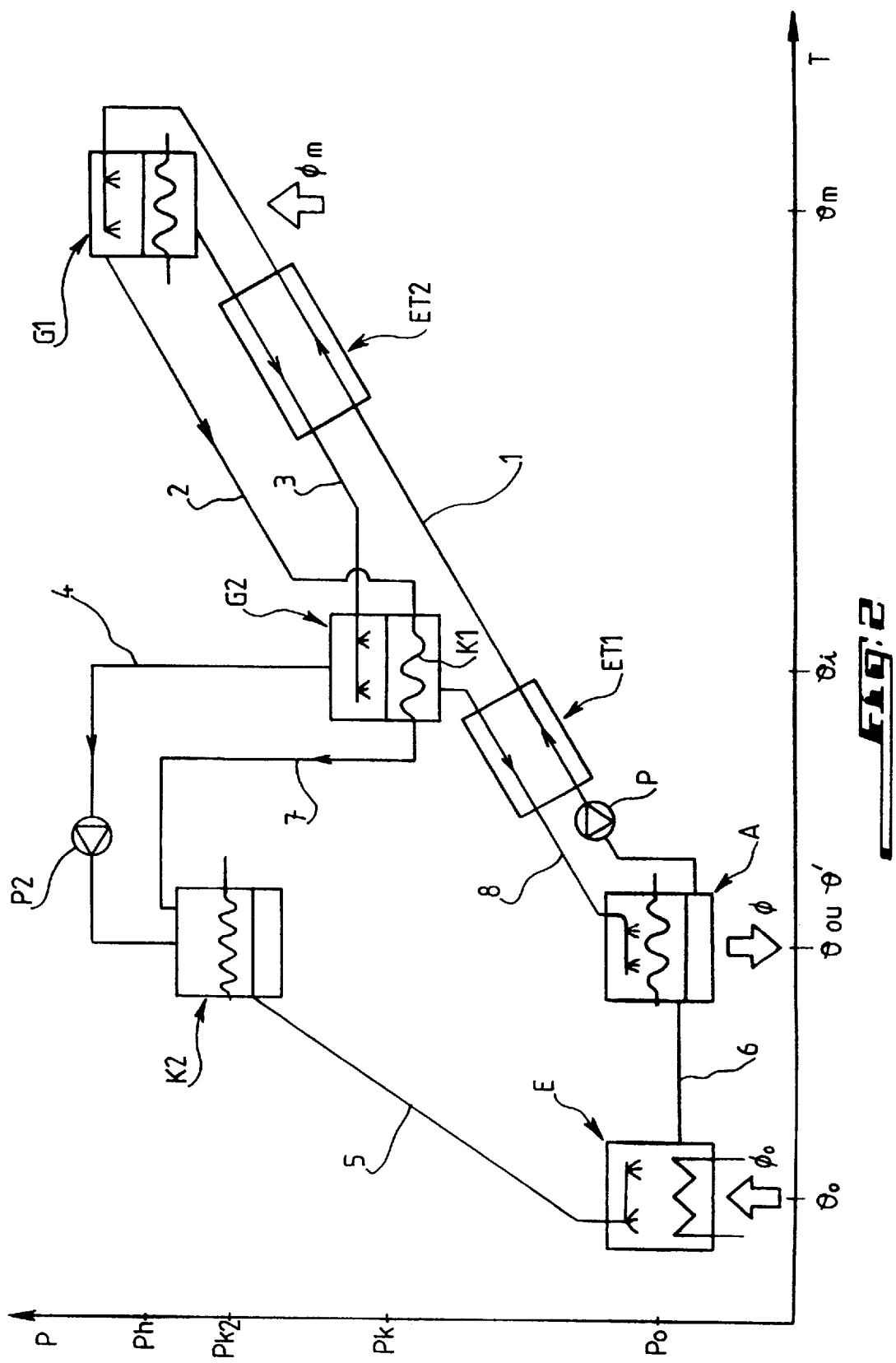
FIG. 2 is a schematic representation of the refrigeration system according to this invention, indicating the operational conditions of each element in terms of pressure and temperature, the abscissa showing the temperature, the Y-coordinate showing the pressure.

This is accomplished, as shown in FIG. 2 in which identical elements bear the same reference designations as in FIG. 1, by compressing the refrigerant vapors exiting from the generator G2. To that end, a compression device, P2 in FIG. 2, can be installed in the duct 4 per FIG. 2. This compression device can be of any conventional type, whether mechanical or electric.

The condenser K2 is now at a temperature $\theta'$ which may be identical to or different from the temperature level $\theta$ according to prior art, but the pressure Pk2 is as indicated in FIG. 2, namely Pk<Pk2<Ph.

It should be noted at this point that the double separation refrigeration system according to this invention also incorporates the same pressure-drop devices as prior-art double separation refrigeration systems, although they are not described here nor shown in FIG. 2.

By increasing the operating pressure of K2 relative to the operating pressure of G2, a state of thermodynamic equilibrium is created in G2 which is less favorable for the refrigerant so that the solution exiting G2 is more strongly stripped of refrigerant than would be the case for the same solution in a prior-art refrigeration system.

First of all, this stripping action leads to a reduction of the amount of heat $\phi m$ that is to be fed to the generator G1 by changing the necessary circulation of the refrigerant-poor solution for obtaining the desired cooling power.

Consequently, it is also possible to significantly lower the minimum operating temperature $\theta m$ in G1 which again permits a fair reduction of heat loss. In other words, the motive calorific energy is more effectively utilized in the system according to this invention.

In addition, the system according to this invention can be operated at a pressure Ph that is lower (in G1) than that employed in a traditional double separation system.

This means that the energy to be supplied to the solution (element P in FIGS. 1 and 2) for obtaining that pressure level will be less than that needed in a conventional system.

Finally, in the system according to this invention only the part of the refrigerant vapors that emanates from G2 is compressed, which requires less energy than if one wanted to compress all of the refrigerant vapors, i.e. those exiting from G1 and G2 or those circulating in a single-separation absorption refrigeration system.

Apart from this energy reduction, it will be possible to reduce the size of the equipment needed for compressing and condensing the vapors exiting from G2, as compared to the size of the equipment necessary for compressing all of the vapors emanating from G1 and G2. It may also lead to a reduction in size of the overall equipment due to a reduced circulatory flow of the solutions, a reduction made possible by operating conditions which are more favorable in comparison with those of prior-art systems.

The system according to this invention thus permits keeping the minimum operating temperature Em of the generator G1 at the same level as that in prior art while, however, the source of calorific energy $\phi m$ is better utilized and the pressure of the generator G1 can itself be lowered relative to the prior-art system.

As a strictly illustrative example, given the same operating solvent-refrigerant combination and the same operating temperature $\theta m$, the pressure Ph of the generator G1 in the double-separation recompression refrigeration system according to this invention could be 2.2 to 2.5 bars as compared to a pressure Ph of 3 to 3.5 bars of the generator G1 in the prior-art double separation refrigeration system.

Similarly, the performance coefficient or COP of the refrigeration system according to this invention can be increased over that of the prior-art system.

However, the performance of the absorption refrigeration system according to this invention depends on the practical application of the operating solvent-refrigerant combination employed. This combination must first of all constitute a negative deviation relative to Raoult's law, although it has been shown that this deviation need not be too substantial. In fact, when one uses a highly suitable operating solvent-refrigerant combination which allows for a low solution flow rate, the gain due to the compression is no longer significant relative to the energy surplus needed to assure that compression.

There are other known operating combinations that have been employed in absorption refrigeration systems. For example, methanol is often used as the refrigerant, in combination with an absorbant (solvent) such as lithium bromide or zinc bromide salts.

Similarly, organic solvents such as tetraethylene glycol dimethylether and glycerol have been used as methanol solvents.

This invention proposes a new operating solvent-refrigerant combination which permits a further improvement of the COP of the refrigeration system according to this invention.

This combination consists of methanol as the refrigerant in association with a methylphenol or a mixture of methylphenols, products also known by the name cresols or cresilic acid, terms often used by the Anglosaxons.

The basic chemical formula for the cresols is $C_7H_8O$. They are cyclic alcohols which allow for a substantial absorption of methanol due to the ability to form strong hydrogen bonds between the solvent and the dissolved substance. They also have high boiling point temperatures which favor separation in the generators. Their stability is a function of the absence in the ducts of any substance or material that could induce a gradation reaction of one of the constituents of the operating combination; air can be mentioned as one example. Finally, their cost is low.

The cresols are found in the form of orthocresol, metacresol and paracresol. The cresol-methanol combination responds perfectly to the thermodynamic requirements of the cycle that is inherent in the refrigeration system according to this invention. While in fact the deviations induced relative to Raoult's law do exist, they are weaker than in the case where methanol is combined with one or several salts.

As a strictly illustrative example, while the theoretical COP obtained with a double separation absorption system with recompression according to this invention using a prior-art operating methanol-solvent combination is 0.9, the COP with the same system using the cresol-methanol operating combination according to this invention can reach values up to 1.3 and is generally not less than 1.1.

It will be readily evident to the expert that, although the preceding description refers only to its use in double separation absorption refrigeration systems, the cresol-methanol operating combination according to this invention can be employed equally well in all other absorption refrigeration systems known to date.

Also, although the fact was mentioned that the refrigeration system according to this invention does not allow for a significant gain relative to the energy surplus necessary for the recompression, added in the system according to this invention, when employing a lithium bromide-water combination, the refrigeration system according to this invention can be used with an operating combination other than that specifically described in this invention.

Of course, this invention is by no means limited to the modes of implementation described and illustrated herein which have been given as examples only.

The refrigeration system according to this invention can thus also be used for freezing, the cold source being the evaporator E while for generating heat the heat source consists of the condenser K2 and the absorber A.

The invention thus covers all of the technical equivalents of the means described and any of their combinations employed within the spirit of the invention.

What is claimed is:

1. A double separation absorption refrigeration system comprising:

a first generator (G1) at a pressure Ph and a temperature θm, and being in hydraulic connection to a refrigerant and solvent supply duct channel (1), a refrigerant outlet duct channel (2), and a refrigerant and solvent outlet duct channel (3);

a second generator (G2) in hydraulic communication via duct channel (3) with said first generator, wherein the second generator is at a pressure Pk and a temperature θi, wherein Pk is lower than Ph and θi is lower than θm, and wherein the second generator is in hydraulic connection with a refrigerant outlet duct channel (4) and a refrigerant outlet duct channel (8);

a condenser (K2) in hydraulic communication via duct channel (2) with said first generator (G1), in hydraulic communication via duct channel (4) with said second generator (G2), and in hydraulic connection with outlet duct channel (5), wherein the condenser is at pressure $Pk_2$ and a temperature of θ, wherein $Pk_2$ is greater than Pk but lower than Ph, and wherein temperature θ is lower than θi;

an evaporator (E) at a pressure Po and a temperature of θo, wherein said evaporator is in hydraulic connection with condenser K2 via duct channel (5) and with outlet duct channel (6), wherein Po is lower than Pk, and wherein temperature θo is lower than θi;

an absorber (A) at a pressure of approximately Po and a temperature θ, wherein said absorber is in hydraulic connection with evaporator E via duct channel (6) and with outlet duct channel (1);

a compression device (P) having an inlet side and an outlet side, said compression device being operatively located in the duct channel (1) and in hydraulic connection with absorber (A) on the inlet side and with generator (G1) on the outlet side; and a refrigerant and a solvent.

2. The refrigeration system of claim 1, further comprising a vapor compression device (P2) having an inlet side and an outlet side, said compression device being operatively located in the duct channel (4) and in hydraulic connection with generator (G2) on the inlet side and with condenser K2 on the outlet side.

3. The refrigeration system of claim 2, wherein the refrigerant-solvent combination exhibits a negative deviation relative to Raoult's Law.

4. The refrigeration system of claim 2, wherein the solvent comprises one or more methylphenols and the refrigerant comprises methanol.

5. The refrigeration system of claim 2, wherein the methylphenols are one or more of orthocresol, metacresol, or paracresol.

6. The refrigeration system of claim 2 further comprising a heat exchanger (ET2) which is thermally connected to duct channel (1) and duct channel (3).

7. The refrigeration system of claim 2 further comprising a duct channel (8) in hydraulic connection with generator (G2) and with absorber (A), wherein said hydraulic connection to generator (G2) is such that solvent-rich and refrigerant-depleted fluid can enter duct channel (8) from the generator (G2).

8. The refrigeration system of claim 7 further comprising a heat exchanger (ET1) which is thermally connected to duct channel (1) and duct channel (8).

9. The refrigeration system of claim 2 further comprising:
- a heat exchanger (ET2) which is thermally connected to duct channel (1) and duct channel (3);
- a duct channel (8) in hydraulic connection with generator (G2) and with absorber (A), wherein said hydraulic connection to generator (G2) is such that solvent-rich and refrigerant-depleted fluid can enter duct channel (8) from the generator (G2);
- a heat exchanger (ET1) which is thermally connected to duct channel (1) and duct channel (8); and
- a refrigerant and solvent which, in combination, exhibits a negative deviation relative to Raoult's Law.

10. The refrigeration system of claim 9 wherein the solvent comprises a cresol and wherein the refrigerant comprises methanol.

11. The refrigeration system of claim 9 wherein the solvent comprises lithium bromide or zinc bromide or combinations thereof, and wherein the refrigerant comprises methanol.

12. The refrigeration system of claim 9 wherein the solvent comprises tetraethylene glycol, glycerol, or mixtures thereof, and wherein the refrigerant comprises methanol.

13. A refrigerant-solvent operating combination for use in an absorption refrigeration system, said combination comprising a methylphenol solvent and methanol refrigerant.

14. The refrigerant-solvent operating combination of claim 13, wherein the methylphenol comprises one or more of orthocresol, metacresol, and paracresol.

15. A process of cooling with an absorption refrigeration system, said process comprising:
- separating a solvent-refrigerant operating combination comprising a solvent and a refrigerant in a first generator (G1) into a refrigerant vapor and a refrigerant-depleted solvent-refrigerant operating combination, wherein the first generator (G1) is at a pressure Ph and a temperature $\theta m$;
- conveying the vaporous refrigerant from the first generator to condenser (K2), wherein the condenser (K2) is at temperature $\theta$ and at pressure $Pk_2$, and wherein $\theta$ is less than $\theta m$ and $Pk_2$ is less than Ph;
- conveying the refrigerant-depleted solvent-refrigerant operating combination from the first generator (G1) to a second generator (G2), wherein the second generator (G2) is at temperature $\theta i$ and at pressure PK, wherein $\theta i$ is less than $\theta m$ and greater than $\theta$, and wherein PK is less than Ph and less than $Pk_2$;
- separating the refrigerant-depleted solvent-refrigerant operating combination in the second generator (G2) into a refrigerant vapor and a further-refrigerant-depleted solvent-refrigerant operating combination;
- compressing the refrigerant vapor from generator (G2), and providing the vapor to the condenser (K2);
- conveying the refrigerant from the condenser (K2) to an evaporator (E), wherein the evaporator (E) is at temperature $\theta o$ and at pressure Po, wherein evaporator (E) is in thermal connection to an item to be cooled, wherein $\theta o$ is less than $\theta$, and wherein Po is less than PK;
- evaporating the refrigerant in evaporator (E), obtaining the thermal energy from the item to be cooled;
- conveying the refrigerant vapor from the evaporator (E) and conveying the further-refrigerant-depleted solvent-refrigerant operating combination from generator (G2) to an absorber (A), wherein the absorber (A) is operated at temperature $\theta'$ and pressure Po, wherein $\theta'$ is greater than $\theta o$ and less than $\theta i$, thereby combining the two into a solvent-refrigerant operating combination; and
- heating and compressing the solvent-refrigerant operating combination from absorber (A) to temperature $\theta m$ and pressure Ph, and conveying this combination to the first generator (G1).

16. The cooling process of claim 15, wherein the solvent-refrigerant operating combination comprises one or more methylphenols and methanol.

17. The cooling process of claim 14, wherein said methylphenols are one or more of orthocresol, metacresol and paracresol.

* * * * *